(12) United States Patent
Caubel

(10) Patent No.: US 9,359,070 B2
(45) Date of Patent: Jun. 7, 2016

(54) ROTARY-WING DRONE WITH GEARLESS-DRIVE AND FAST-MOUNTING PROPELLERS

(71) Applicant: PARROT, Paris (FR)

(72) Inventor: Christine Caubel, Paris (FR)

(73) Assignee: PARROT, Paris (FR)

( * ) Notice: Subject to any disclaimer, the term of this patent is extended or adjusted under 35 U.S.C. 154(b) by 30 days.

(21) Appl. No.: 14/539,753

(22) Filed: Nov. 12, 2014

(65) Prior Publication Data

US 2015/0129711 A1 May 14, 2015

(30) Foreign Application Priority Data

Nov. 13, 2013 (FR) ...................... 13 61061

(51) Int. Cl.
| | |
|---|---|
| *B64C 27/08* | (2006.01) |
| *B64C 27/48* | (2006.01) |
| *B64C 39/02* | (2006.01) |
| *A63H 27/00* | (2006.01) |

(52) U.S. Cl.
CPC ............. *B64C 27/08* (2013.01); *A63H 27/12* (2013.01); *B64C 27/48* (2013.01); *B64C 39/024* (2013.01); *B64C 2201/024* (2013.01); *B64C 2201/027* (2013.01); *B64C 2201/042* (2013.01); *B64C 2201/108* (2013.01)

(58) Field of Classification Search
CPC ...... B64C 27/08; B64C 27/48; B64C 39/024; B64C 2201/024; B64C 2201/022; B64C 2201/042; B64C 2201/108; A63H 27/12
See application file for complete search history.

(56) References Cited

U.S. PATENT DOCUMENTS

| | | | | |
|---|---|---|---|---|
| 4,252,504 A | * | 2/1981 | Covington | .............. B64C 27/50 416/143 |
| 4,363,604 A | * | 12/1982 | Broberg, Jr. | ............ B64C 11/14 403/348 |
| 5,240,374 A | * | 8/1993 | Speer | ....................... B63H 3/04 416/136 |
| 5,593,283 A | * | 1/1997 | Scott | ..................... F04D 19/002 416/169 A |
| 6,036,442 A | * | 3/2000 | Certain | ................... B64C 27/50 416/143 |

\* cited by examiner

*Primary Examiner* — Tien Dinh
*Assistant Examiner* — Richard R Green
(74) *Attorney, Agent, or Firm* — Haverstock & Owens LLP

(57) ABSTRACT

Each propulsion unit of the drone comprises a propeller (20) and a rotary-cage synchronous electric motor whose stator is connected to the drone body. The propulsion unit in of the gearless type, the rotor of the motor being rotationally integral with the propeller hub (24). The rotor is integral with an upper flange (56) extending in a radial plane with respect to the axis of rotation. Reversible means are provided for the fast coupling of the propeller to the rotor, implementing studs (62) with an enlarged head (66) formed on the flange, which cooperate with homologous curvilinear buttonholes (32) formed on the hub. The switching from the decoupled position to the locked position is operated by relative rotation of the propeller hub with respect to the flange by a fraction of a turn, in an opposite direction with respect to the direction of rotation of the motor.

7 Claims, 3 Drawing Sheets

ROTARY-WING DRONE WITH GEARLESS-DRIVE AND FAST-MOUNTING PROPELLERS

The invention relates to the rotary-wing drones, such as quadricopters. Such drones are provided with several propulsion units, with for each one a propeller driven by a respective motor. The different motors can be controlled in a differentiated manner to pilot the drone in attitude and speed. A typical example of such a drone is the AR.Drone of Parrot SA, Paris.

The WO 2011/058257A1 describes more precisely the structure of the propulsion units of this drone, which each include a propeller driven a by an electric motor, via a system for reducing the generally very high rotational speed of this motor. The propulsion unit is moreover extended in its lower portion by an excrescence forming a pad on which the drone can be supported when it is on the ground, which avoid having to provide additional feet on the drone body.

The propulsion unit has to be easily dismountable, to allow the replacement of the motor as well as that of the propeller, for example in case of damage on the latter after a shock against an obstacle.

If it is desired to reduce the size of the drone, this reduction also applies to the size of the propellers. Therefore, to have a same lifting force with smaller propellers, it is advisable to significantly increase their rotational speed, which leads to use gearless motors, without speed reducer. They may be in particular motors of the rotary-cage brushless synchronous type, comprising a stator connected to the drone body and carrying the windings, associated with a rotor consisted by the rotary cage with its magnetic elements.

The propeller is in this case mounted directly on the rotor cage, and rotates at the same speed than the latter. Concretely, the propeller is fastened to the rotary cage by screws, or mounted on the latter by means of a central nut that presses it on the top of the cage.

The DE 10 2005 010 336 A1 describes such a system for mounting a propeller on a drone.

Such configuration has two drawbacks.

Firstly, the vertical bulk of the propulsion unit comprises the height of the motor to which is added the thickness of the propeller, corresponding mainly to the height of the blades, as, due to the gearless drive, the propeller is necessarily located above the motor, in the continuation of the rotary cage. This bulk goes against the above-mentioned reduction of the drone size.

Secondly, to mount and dismount each propeller, it is necessary to use a tool such as a screwdriver or a wrench, or to provide an additional locking component, liable to be lost with time. If an interlocking fastening system is desired, a difficulty arises resulting from the fact that the propeller is integral with the rotary cage and that the latter is fully free in rotation when the motor is not powered. At the time of dismounting, it will be very difficult to separate the propeller interlocked to the cage that is never braked, unlike a conventional system in which the reducing gear train interposed between the motor and the propeller opposes a resistance to the rotation of the propeller when it is tried to manually rotate the latter.

The CH 333 967 A and FR 2 117 376 A5 describe still other systems for mounting a flying-toy propeller.

The object of the invention is to solve these two difficulties, by proposing a new system for coupling a propeller and a rotary cage of a synchronous motor, which:
- minimises the vertical bulk of the motor-propeller unit;
- allows fast fastening and dismounting of the propeller to/from the rotary cage of the motor, with no tool; and
- allows to easily hold and immobilize the rotor cage with the propeller mounted thereon, with only one hand, so that the user can take the propeller with his other hand to decouple it from the motor.

It will also be seen that the invention allows to have simple foolproofing means for discriminating propellers visually similar but designed to rotate in opposite directions. Indeed, in a quadricopter, two diametrically opposed propellers rotate in a same direction, which is opposite to that of the two other propellers. The rotating and contra-rotating propellers are not identical, and it is difficult to make the visual distinction between them, so that it may be useful to have a foolproofing system forbidding for example to mount propellers of a given type on motors rotating in the opposite direction with respect to that for which these propellers have been designed. To achieve the above-mentioned objects, the invention proposes a rotary-wing drone of the type known, for example, from the above-mentioned DE 10 2005 010 336 A1, i.e. comprising a drone body and a plurality of propulsion units each comprising: a propeller comprising a hub and a plurality of blades; and an electric motor of the rotary-cage brushless synchronous type, with a stator connected to the drone body and a rotor mobile about an axis of rotation of the motor for driving the propeller. The propulsion unit is of the gearless type, the rotor is rotationally integral with the propeller hub and integral with an upper flange extending in a radial plane with respect to the axis of rotation, and means for gripping this flange are provided.

Characteristically of the invention, reversible means are provided for the fast coupling of the propeller to the rotor between a decoupled position allowing the interlocking of the hub onto the flange, and a locked position in which the hub is mechanically made rotationally integral with the flange. The switching from the decoupled position to the locked position is operated by a relative rotation of the propeller hub with respect to the flange by a fraction of a turn, in an opposite direction with respect to the direction of rotation of the electric motor, and the means for gripping the flange are means for gripping the latter in said locked position.

In a particular embodiment, the reversible fast coupling means advantageously comprise: on the flange, a plurality of studs arranged radially remote from the axis of rotation, each stud comprising a rod portion topped with an enlarged head adapted to ensure the holding of the hub against the flange; and on the hub, a plurality of buttonholes whose number and arrangement correspond to the number and arrangement of the studs on the flange, each buttonhole comprising a curvilinear slot extending along a circumference, the width of the slot corresponding to the rod portion of the corresponding stud, and the slot comprising at a first end an enlarged portion whose size allows the introduction of the stud head.

According to various subsidiary advantageous characteristics:
- in the locked position, the stud head projects above the upper surface of the hub;
- the flange gripping means comprise a projecting portion with a ridge, formed on the stud heads;
- the edges of the slot have an increased thickness near a second end opposite to the first end, this thickness being defined, with respect to the spacing between the upper surface of the flange and the lower surface of the stud head, so as to form with the stud head a loose fit in the decoupled position and a press fit in the locked position;
- the rotor comprises a cylindrical lateral skirt extending from the upper flange, this skirt carrying magnetic elements of the rotary cage and defining with the flange an inner volume accommodating windings of the motor stator;

foolproofing means are further provided, which comprise a axis of the rotor, projecting, or not, above the flange and a central orifice formed, or not, in the hub, so as to prevent the interlocking of a hub devoid of a central orifice onto a flange provided with a projecting axis.

An exemplary embodiment of the invention will now be described, with reference to the appended drawings in which the same references denote identical elements throughout the figures.

An embodiment of the invention will now be described, which is given only by way of non-limitative example of many variations of the different elements described that can be contemplated without departing from the framework of the invention.

Figure 1:
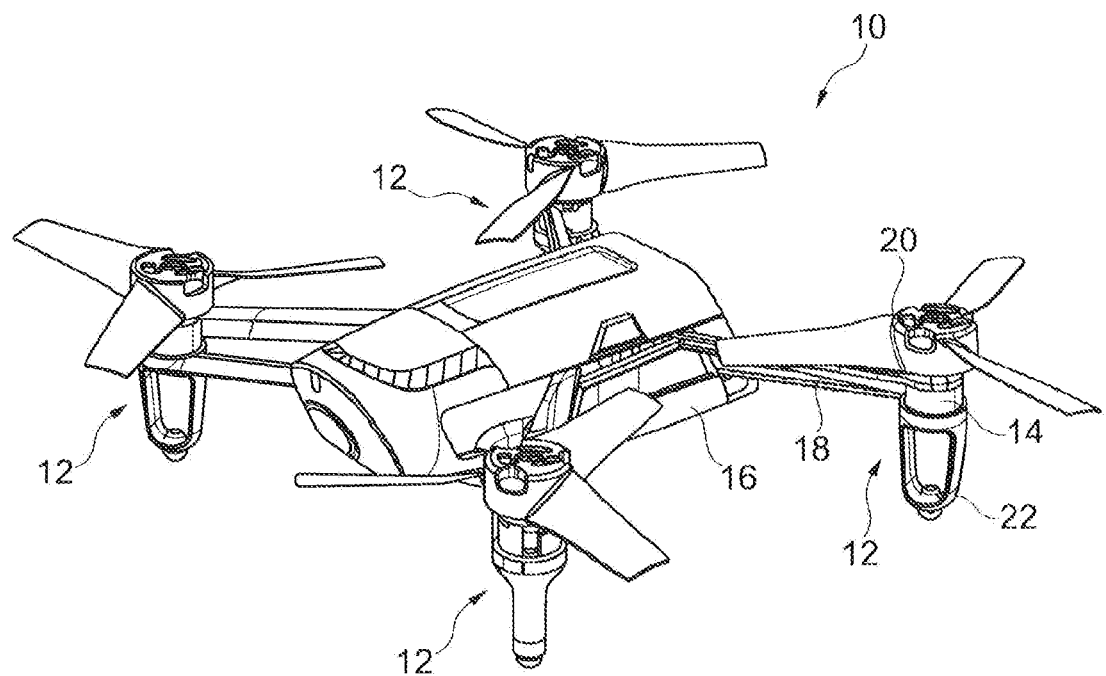
FIG. 1 is a perspective view of a drone according to the invention, with its four propulsion systems.

In FIG. 1, the reference 10 generally denotes a drone of the quadricopter type, with four propulsion systems 12. Each propulsion system 12 comprises a fixed portion 14 accommodating the driving motor and connected to the body 16 of the drone by an arm 18. The motor of each propulsion system drives into rotation a respective propeller 20 extending in an approximately horizontal plane above the fixed portion 14 and the arm 18. In the lower portion, the propulsion unit is extended by a stirrup 22 forming a foot by which the drone can be supported on the ground.

Figure 2:
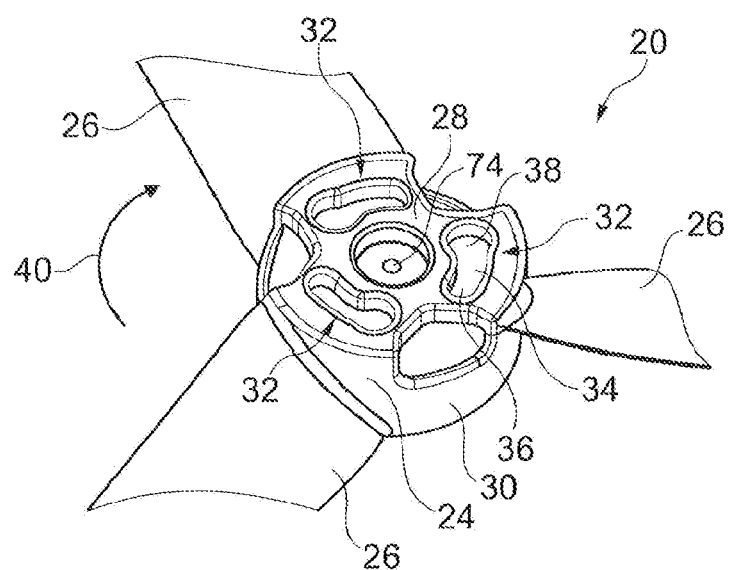
FIG. 2 is a detail perspective view of the central portion of a propeller of the drone according to the invention, this propeller being considered in insolation, showing the hub and the blade roots.

FIG. 2 illustrates in a perspective view the central portion of a propeller of the drone according to the invention, considered in isolation.

This propeller includes essentially a hub 24 from which extend radially blades 26, for example three in number in the example illustrated. The hub 24 and the blades 26 are advantageously made as a single part, for example from a plastic material moulded as a single part.

Characteristically, the hub 24 comprises an upper wall 28 in the form of a flat disc extended at its periphery by an outer cylindrical wall 30 carrying the blades 26. The upper wall 28 is provided with a plurality of buttonholes 32, preferably in a number equal to that of the blades, each consisted by a slot 34 of substantially constant width, this slot being curvilinear and extending remote from the central axis of the hub along a circumference. The slot 34 includes two rounded ends, with a front end 36 and a rear end 38 (these designations corresponding to the direction of rotation of the propeller, as shown by the arrow 40). The front end is rounded and has a width identical to that of the slot, whereas the rear end 38 is enlarged, with for example a circular shape of a diameter slightly higher than that of the width of the remaining of the slot.

Figure 3:
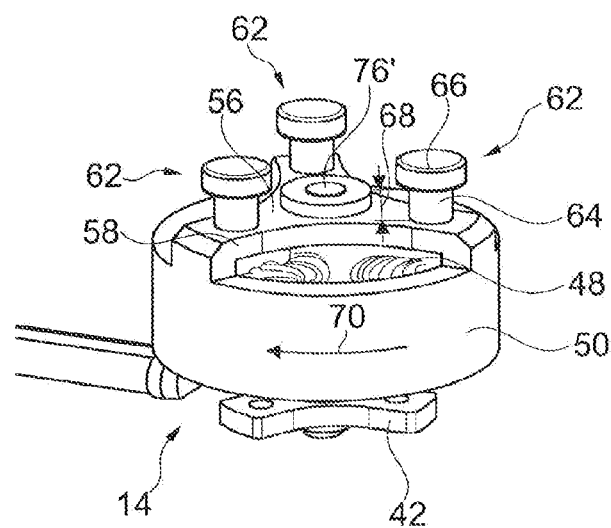
FIG. 3 is a perspective view of the rotary-cage driving motor, considered in isolation before the mounting of the propeller.
Figure 4:
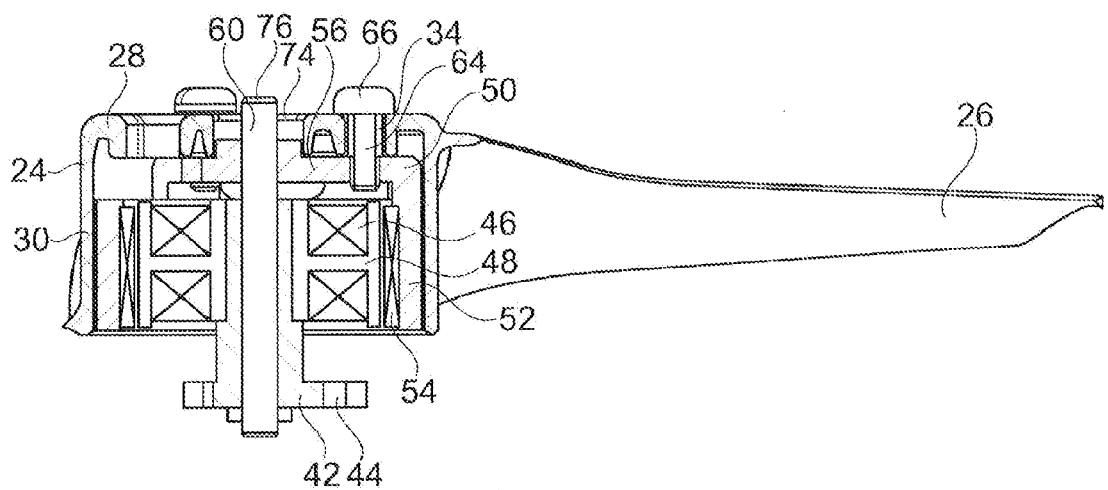
FIG. 4 is a sectional view of the propulsion system according to an axial plane, with the propeller fastened to the motor, this figure showing in particular the inner structure of the rotary-cage motor and the way the propeller hub is fastened to this rotary cage.

FIGS. 3 and 4 illustrate the structure of the rotary-cage motor, considered in isolation (FIG. 3, perspective view) or with the propeller shown above it (FIG. 4, sectional view). The motor 14 comprises a fixed portion 42 forming a support, integral with the arm 18 of connection to the drone body and provided with orifices 44 to allow the screwing of the foot 22 during a dismounting operation.

The fixed portion of the motor also carries a plurality of fixed windings 46 wound on respective mandrels 48, these windings 46 being wound about an axis oriented radially with respect to the axis of rotation of the motor and constituting the different elements of the stator of the synchronous motor allowing the creation of a rotating field between the different windings.

The other element of the motor is the rotor, consisted of a rotary cage 50 to which the propeller is fastened for the gearless driving of the latter.

More precisely, the rotary cage 50 comprises a lateral cylindrical skirt 52 whose external diameter is equal to the inner diameter of the cylindrical wall 30 of the propeller hub 24, so that this hub can be interlocked onto the rotary cage 50, with a very slight clearance, so that the propeller can rotate about the cage during the mounting/dismounting of this propeller on the motor, as explained hereinafter with reference to FIGS. 5a and 5b.

The lateral skirt 52 carries, on the inner side, the magnetic elements (permanent magnets) 54 intended to be driven by the rotating field created by the windings 46 arranged opposite to each other.

In the upper portion, the rotary cage comprises a flattened face or flange 56 in the form of a flat disc, against which the inner face of the upper wall 28 of the propeller hub is intended to be applied when the latter is interlocked onto the rotary cage. In the example illustrated, this flange 56 is connected to the lateral skirt 52 by radial arms 58, so as to form openings allowing to cool the windings and having further the advantage to make the structure accordingly lighter.

The rotary cage 50 is mounted on a fixed central shaft 60 of the motor, on which it can rotate freely, being never braked when the motor is not powered.

The flange 56 of the rotary cage supports a plurality of studs 62, whose number and arrangement correspond to those of the buttonholes 32 of the propeller hub. Each stud is formed of a cylindrical central portion 64 topped with an enlarged head 66. The spacing 68 between the surface of the flange 56 and the underside of the head 66 of the stud is equal to the thickness of the upper wall 28 of the propeller hub, which allows to constrain the latter in the vertical direction once the propeller mounted on the motor.

Another function of the studs 62 is to allow to grip the rotor with the hand when the propeller is mounted on the motor (configuration of FIGS. 4 and 5b) through projecting heads 66 that projects from the upper wall 28 of the propeller hub. In order to avoid the sliding of the fingers on the heads of the studs 66, these heads have sufficient height and diameter to be gripped, and can possibly also have a ridge and another angular shape.

Finally, the studs 62 ensure the driving of the propeller by the motor, through the cylindrical rod 64 of the stud, which come in rest against the thickness of the hub at the front end 36 of the slot 32.

The studs 62 may be made in various manners, for example moulded or machined in the upper portion of the rotary cage, or formed of added elements such a shouldered screws or over-moulded or press-fit inserts.

Figure 5A:
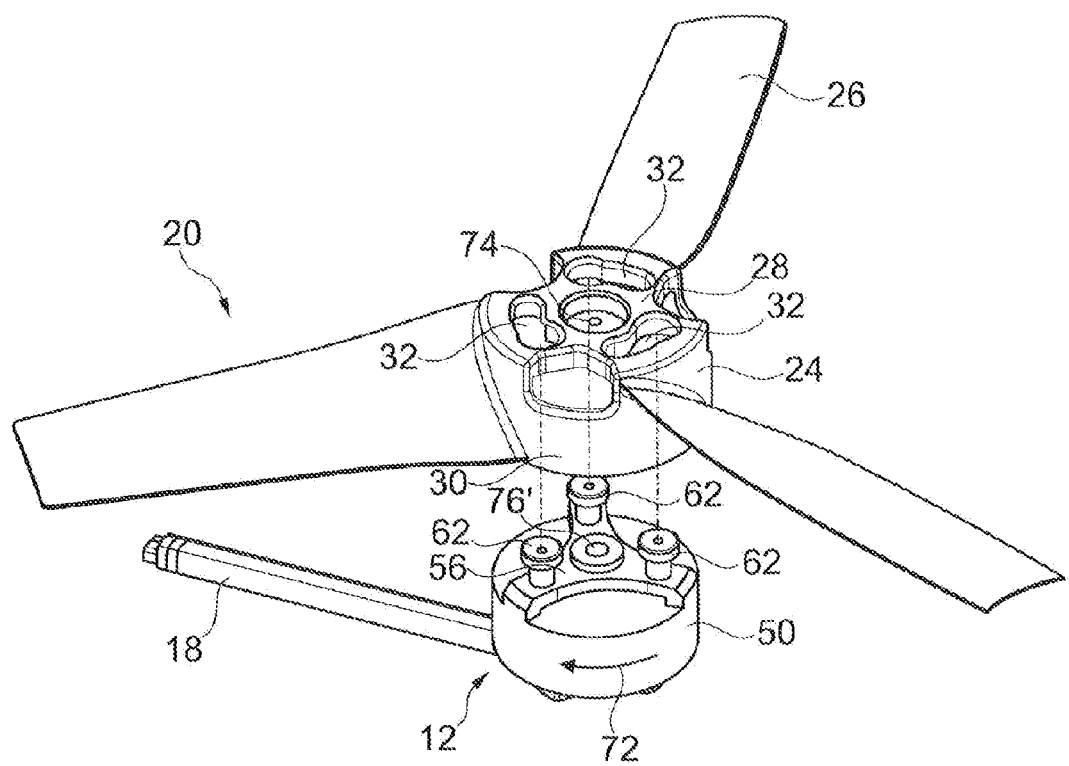
FIGS. 5a and 5b are perspective views of the motor and the propeller intended to explain how to mount the propeller to the motor, at the time when the propeller is positioned above the rotary cage of the motor and after the final assembly of these two elements, respectively.
Figure 5B:
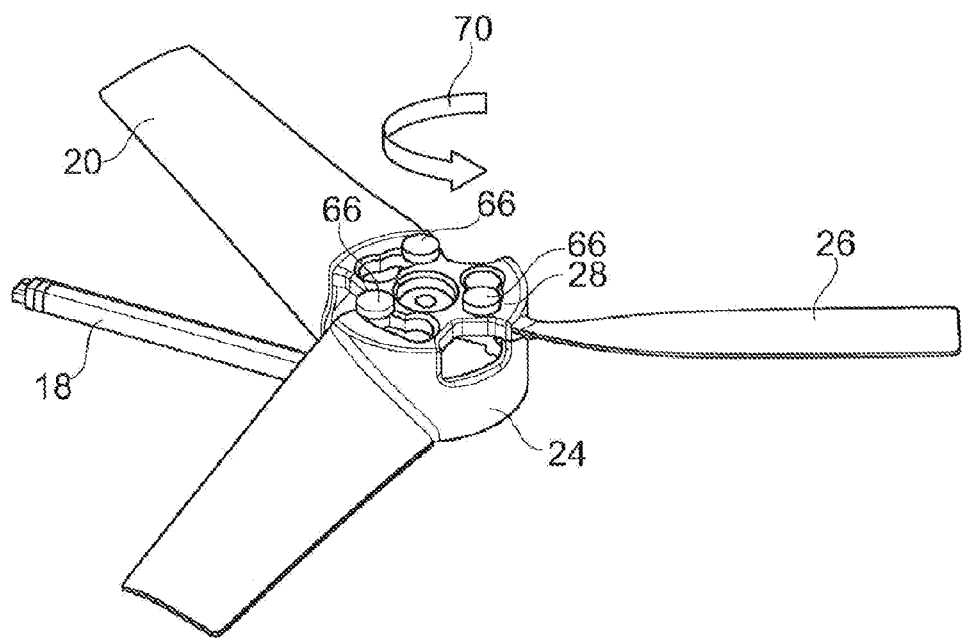

FIGS. 5a and 5b are perspective views of the motor and the propeller explaining how to mount the propeller on the motor, at the time when the propeller is positioned above the rotary cage of the motor and after the final assembly of these two elements, respectively.

The first phase of the operation, illustrated in FIG. 5a, consists in positioning the propeller above the motor so that the heads of the studs 62 are located opposite the rear, enlarged ends 38 of each of the buttonholes 32. The propeller is then interlocked onto the rotary cage 50, the studs 62 passing through the buttonholes 32, by their head, at their enlarged end.

The following phase, illustrated in FIG. 5b, consists in making the propeller rotate by a fraction of a turn in a direction (arrow 70) that is opposite to the direction of rotation of the motor and the propeller (arrow 72). This operation allows to position the cylindrical rod 64 of each stud against the front end 36, hence allowing the transmission of the driving force to the propeller by the rotary cage of the motor.

Advantageously, the thickness of the flange is slightly increased in the region of the front end 36, so as to provide a locking effect with press-fitting of the studs and the propeller hub in the final operating position, which avoids too severe dimensional tolerances on the dimensions of the studs.

It is possible to provide a simple foolproofing between the rotating and contra-rotating propellers, respectively, of the drone by forming, or not, according to the type of propeller, a central opening 74 (FIGS. 2 and 5a) at the centre of the propeller hub 24, and by providing to make, for the central axis 60 of the motor, at the flange, a projecting portion 76 (as in FIG. 4) or on the contrary a non-projecting portion (as in 76' in FIGS. 3 and 5a). It hence becomes impossible to mount the propellers devoid of a central orifice 74 on motors comprising a projecting axis 76, and the user will be unable to mount the four propellers of the drone in another way than in their correct configuration of rotation.

The invention claimed is:

1. A rotary-wing drone (10) comprising a drone body (16) and a plurality of propulsion units (12) each comprising:
   a propeller (20) comprising a hub (24) and a plurality of blades (26); and
   an electric motor (14), with a stator connected to the drone body and a rotor mobile about an axis of rotation of the motor for driving the propeller,
wherein:
   the propulsion unit is gearless;
   the rotor is rotationally integral with the propeller hub and integral with an upper flange (56) extending in a radial plane with respect to the axis of rotation; and
   means for gripping the flange are provided,
characterized in that the propulsion units further comprise:
   reversible means for the fast coupling of the propeller to the rotor between:
      a decoupled position allowing the interlocking of the hub onto the flange, and
      a locked position in which the hub is mechanically made rotationally integral with the flange,
   the switching from the decoupled position to the locked position being operated by a relative rotation of the propeller hub with respect to the flange by a fraction of a turn, in an opposite direction with respect to the direction of rotation of the electric motor,
   and said means for gripping the flange being means for gripping the latter in said locked position.

2. The drone of claim 1, wherein the reversible fast coupling means comprise:
   on the flange, a plurality of studs (62) arranged radially remote from the axis of rotation, each stud comprising a rod portion (64) topped with an enlarged head (66) adapted to ensure the holding of the hub against the flange; and
   on the hub, a plurality of buttonholes (32) whose number and arrangement correspond to the number and arrangement of the studs on the flange, each buttonhole comprising a curvilinear slot (34) extending along a circumference, the width of the slot corresponding to the rod portion of the corresponding stud, and the slot comprising at a first end (38) an enlarged portion whose size allows the introduction of the stud head.

3. The drone of claim 2, wherein, in the locked position, the stud head projects above the upper surface of the hub.

4. The drone of claim 2, wherein the flange gripping means comprise a projecting portion with a ridge, formed on the stud heads.

5. The drone of claim 2, wherein the edges of the slot have an increased thickness near a second end opposite to the first end, this thickness being defined, with respect to the spacing between the upper surface of the flange and the lower surface of the stud head, so as to form with the stud head a loose fit in the decoupled position and a press fit in the locked position.

6. The drone of claim 1, wherein the rotor comprises a cylindrical lateral skirt (52) extending from the upper flange, this skirt carrying magnetic elements (54) of the rotary cage and defining with the flange an inner volume accommodating windings (46) of the motor stator.

7. The drone of claim 1, wherein foolproofing means are further provided, which comprise a axis of the rotor, projecting (76), or not (76'), above the flange and a central orifice (74) formed, or not, in the hub, so as to prevent the interlocking of a hub devoid of a central orifice onto a flange provided with a projecting axis.

* * * * *